US011958690B2

(12) United States Patent
Kakinuki et al.

(10) Patent No.: US 11,958,690 B2
(45) Date of Patent: Apr. 16, 2024

(54) RACK FOR AUTOMATED WAREHOUSES

(71) Applicant: Murata Machinery, Ltd., Kyoto (JP)

(72) Inventors: Tsuyoshi Kakinuki, Inuyama (JP); Osamu Fukuta, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 584 days.

(21) Appl. No.: 17/272,832

(22) PCT Filed: Jul. 9, 2019

(86) PCT No.: PCT/JP2019/027191
§ 371 (c)(1),
(2) Date: Mar. 2, 2021

(87) PCT Pub. No.: WO2020/049862
PCT Pub. Date: Mar. 12, 2020

(65) Prior Publication Data
US 2021/0253353 A1    Aug. 19, 2021

(30) Foreign Application Priority Data

Sep. 7, 2018 (JP) ................................ 2018-167636

(51) Int. Cl.
*A47B 47/00* (2006.01)
*B65G 1/04* (2006.01)
*B65G 1/14* (2006.01)

(52) U.S. Cl.
CPC ............ *B65G 1/14* (2013.01); *A47B 47/0083* (2013.01); *B65G 1/04* (2013.01)

(58) Field of Classification Search
CPC ... B65G 1/14; B65G 1/04; B65G 1/02; B65G 1/0492; A47B 47/021; A47B 47/0083;
(Continued)

(56) References Cited

U.S. PATENT DOCUMENTS 1,917,764 A * 7/1933 Howie ................. A47B 47/028
29/897
3,102,641 A * 9/1963 Konstant ................ A47B 57/30
52/646
(Continued)

FOREIGN PATENT DOCUMENTS

DE    102012025154 B4 *  7/2021 ............... B65G 1/02
JP    52-096874           7/1977
(Continued)

OTHER PUBLICATIONS

International Preliminary Report on Patentability dated Mar. 18, 2021, of counterpart International Application No. PCT/JP2019/027191.

*Primary Examiner* — Jennifer E. Novosad
(74) *Attorney, Agent, or Firm* — DLA Piper LLP (US)

(57) ABSTRACT

A rack for automated warehouses includes: a plurality of first support posts arranged on an installation surface along a first horizontal direction; a plurality of second support posts arranged on the installation surface along the first horizontal direction; a plurality of beam members laid over between the first support posts and the second support posts; a plurality of upper intermediate posts disposed on upper sides of the beam members and connected to the beam members; and a plurality of lower intermediate posts disposed between the installation surface and the beam members and connected to the beam members. The lower intermediate posts include a plurality of first lower intermediate posts disposed in series along the first horizontal direction. The first lower intermediate posts are disposed such that the distance to the first support posts is greater than the distance to the second support posts.

14 Claims, 6 Drawing Sheets

(58) Field of Classification Search
CPC ... A47B 47/027; A47B 47/02; A47B 47/0058; A47B 47/028; A47B 96/14; A47B 96/1433; A47B 96/1441
USPC .................................................. 211/191
See application file for complete search history.

(56) References Cited

U.S. PATENT DOCUMENTS

| | | | | |
|---|---|---|---|---|
| 3,337,061 | A * | 8/1967 | Caudell | B65G 1/02 211/134 |
| 3,388,809 | A * | 6/1968 | Elwood | A47B 61/003 248/245 |
| 3,730,601 | A * | 5/1973 | Misenheimer, III | A47B 87/0215 108/190 |
| 3,757,967 | A * | 9/1973 | Colbridge | B65G 1/02 211/151 |
| 4,815,613 | A * | 3/1989 | Hollander | A47B 57/44 211/191 |
| 5,695,081 | A * | 12/1997 | Alkalay | F16B 12/40 211/186 |
| 5,964,361 | A * | 10/1999 | Mefford | A47B 47/022 211/189 |
| 6,062,400 | A * | 5/2000 | Schieler | A47B 47/022 211/151 |
| 6,102,219 | A * | 8/2000 | Wang | A47B 87/00 312/111 |
| 6,223,913 | B1 * | 5/2001 | Mosher | B60P 7/15 224/543 |
| 6,644,484 | B1 * | 11/2003 | Sardis | A47F 5/137 211/189 |
| 6,688,712 | B2 * | 2/2004 | Adams | E04B 1/3483 312/257.1 |
| 6,722,512 | B2 * | 4/2004 | Scully | A47F 5/13 211/183 |
| 6,776,298 | B2 * | 8/2004 | Courtwright | B65G 1/026 211/183 |
| 6,988,704 | B2 * | 1/2006 | Sievers | H05K 7/186 248/676 |
| 8,042,477 | B2 * | 10/2011 | Lee | A47B 57/54 108/147.12 |
| 9,386,855 | B2 * | 7/2016 | Sabounjian | A47B 96/14 |
| 9,629,463 | B1 * | 4/2017 | Brock | A47B 23/04 |
| 10,093,241 | B2 * | 10/2018 | Hughes | B60R 7/08 |
| 10,681,978 | B2 * | 6/2020 | Lim | A47B 47/0041 |
| 10,750,858 | B1 * | 8/2020 | Barre | A47B 45/00 |
| 10,836,576 | B2 * | 11/2020 | Duppong | B65G 1/023 |
| 10,968,039 | B2 * | 4/2021 | Duppong | A47B 96/021 |
| 2006/0016808 | A1 * | 1/2006 | Stoughton | A47B 55/00 410/32 |
| 2006/0118504 | A1 * | 6/2006 | Willemsen | B65D 90/585 211/189 |
| 2006/0157435 | A1 * | 7/2006 | Oberhaus | A47F 5/01 211/187 |
| 2007/0205172 | A1 * | 9/2007 | Stitchick | A47B 96/1458 211/183 |
| 2008/0073303 | A1 * | 3/2008 | Li | A47B 47/0091 211/153 |
| 2008/0302748 | A1 * | 12/2008 | Tsai | A47B 47/047 211/188 |
| 2012/0267332 | A1 * | 10/2012 | Mariani | B65G 1/02 211/183 |
| 2014/0353271 | A1 * | 12/2014 | Kruse | A47F 5/01 211/188 |
| 2016/0007740 | A1 * | 1/2016 | Consaul | B65D 19/40 211/187 |
| 2016/0095430 | A1 * | 4/2016 | Moyer | A47B 47/0091 211/188 |
| 2016/0157605 | A1 * | 6/2016 | Grad | A47B 91/024 108/189 |
| 2016/0331135 | A1 * | 11/2016 | Knudson | A47B 87/0215 |
| 2020/0165064 | A1 * | 5/2020 | Harrison | B65G 1/02 |
| 2021/0253353 | A1 * | 8/2021 | Kakinuki | B65G 1/04 |
| 2023/0013163 | A1 * | 1/2023 | Keller | A47B 47/028 |

FOREIGN PATENT DOCUMENTS

| | | | |
|---|---|---|---|
| JP | 11-116006 | 4/1999 | |
| JP | 2013-124174 | 6/2013 | |
| JP | 2015-020816 | 2/2015 | |
| JP | 2015-081146 | 4/2015 | |
| JP | 2016-023023 | 2/2016 | |
| WO | WO-2020049862 A1 * | 3/2020 | ............... B65G 1/02 |

* cited by examiner

RACK FOR AUTOMATED WAREHOUSES

TECHNICAL FIELD

This disclosure relates to a rack for automated warehouses.

BACKGROUND

In an automated warehouse system, a pair of racks may be disposed back to back as what is called a biserial rack, having lower portions in which space is formed so that a conveyance vehicle can travel therethrough and an article can be delivered or received therein between a stacker crane and the conveyance vehicle (see Japanese Unexamined Patent Publication No. H11-116006, for example). In that automated warehouse system, for example, because a storage-and-retrieval station for an article does not have to be provided in addition to the racks, the system area thereof can be downsized and the efficiency of storing and retrieving an article can be improved.

In the pair of racks described above, for example, to enable a conveyance vehicle carrying a large article to travel therethrough, the depth dimension of each rack needs to be increased.

It could therefore be helpful to provide a rack for automated warehouses that enables a conveyance vehicle to smoothly pass through a lower portion thereof while preventing the depth dimension thereof from increasing.

SUMMARY

We thus provide:

A rack for automated warehouses includes: a plurality of first support posts arranged on an installation surface along a first horizontal direction; a plurality of second support posts disposed to face the first support posts in a second horizontal direction orthogonal to the first horizontal direction, and arranged on the installation surface along the first horizontal direction; a plurality of beam members laid over between the first support posts and the second support posts; a plurality of upper intermediate posts disposed on upper sides of the beam members and connected to the beam members; and a plurality of lower intermediate posts disposed between the installation surface and the beam members and connected to the beam members. The lower intermediate posts include a plurality of first lower intermediate posts disposed in series along the first horizontal direction. The first lower intermediate posts are disposed such that the distance to the first support posts in the second horizontal direction is greater than the distance to the second support posts in the second horizontal direction.

Areas below the beam members and between the first lower intermediate posts and the first support posts facing each other in the second horizontal direction can be used as a traveling path along which a conveyance vehicle carrying an article can travel. Herein, the first lower intermediate posts are disposed such that the distance to the first support posts in the second horizontal direction is greater than the distance to the second support posts in the second horizontal direction. Thus, it is possible to cause the conveyance vehicle to smoothly pass through a lower portion thereof while preventing the depth dimension (width dimension in the second horizontal direction) thereof from increasing.

The lower intermediate posts may further include a plurality of second lower intermediate posts disposed in series along the first horizontal direction, and the second lower intermediate posts may be disposed such that the distance to the second support posts in the second horizontal direction is greater than the distance to the first support posts in the second horizontal direction. With this configuration, areas below the beam members and between the second lower intermediate posts and the second support posts facing each other in the second horizontal direction can be used as a traveling path along which a conveyance vehicle carrying an article can travel. Herein, the second lower intermediate posts are disposed such that the distance to the second support posts in the second horizontal direction is greater than the distance to the first support posts in the second horizontal direction. Thus, by this configuration, it is possible to provide, not only on the side of the first support posts but also on the side of the second support posts, the traveling path along which the conveyance vehicle can smoothly pass while preventing the depth dimension from increasing.

The first lower intermediate posts may be disposed in series between one end portion and a middle portion in the first horizontal direction, and the second lower intermediate posts may be disposed in series between the middle portion and the other end portion in the first horizontal direction. By this configuration, the traveling path for a conveyance vehicle can be switched from the side of the first support posts to the side of the second support posts at the middle portion of the rack in the first horizontal direction.

The rack for automated warehouses may further include: a first brace member provided to portions of the first support posts facing the first lower intermediate posts in the second horizontal direction, the portions of the first support posts located on lower sides of the beam members; and a second brace member provided to portions of the second support posts facing the second lower intermediate posts in the second horizontal direction, the portions of the second support posts located on lower sides of the beam members. By this configuration, it is possible to increase the strength of a lower portion of the rack while preventing dead space from increasing. Furthermore, the first brace member and the second brace member can be disposed in a balanced manner, whereby the earthquake-resistance of the rack can be increased.

Each of the first lower intermediate posts and each of the second lower intermediate posts may have such shapes that the width thereof in the second horizontal direction is larger than the width thereof in the first horizontal direction. By this configuration, it is possible to increase the strength of the lower intermediate posts while preventing dead space from increasing.

The rack for automated warehouses may further include: a first shelf holder provided to a pair of first lower intermediate posts adjacent to each other among the first lower intermediate posts and a pair of second support posts facing the pair of first lower intermediate posts in the second horizontal direction among the second support posts; and a second shelf holder provided to a pair of second lower intermediate posts adjacent to each other among the second lower intermediate posts and a pair of first support posts facing the pair of second lower intermediate posts in the second horizontal direction among the first support posts. When the lower intermediate posts are used as posts for installing the shelf holders in this manner, the structure of the rack can be simplified.

The first lower intermediate posts may be disposed in series from one end portion to the other end portion in the first horizontal direction. By this configuration, it is possible to linearly provide a traveling path along which a conveyance vehicle can smoothly pass while preventing the depth dimension from increasing.

The rack for automated warehouses that enables a conveyance vehicle to smoothly pass through a lower portion thereof while preventing the depth dimension thereof from increasing can thus be provided.

REFERENCE SIGNS LIST rack (rack for automated warehouses)
10a one end portion
10b middle portion
10c the other end portion
21 first support post
22 second support post
23 beam member
25 upper intermediate post
26 lower intermediate post
26A first lower intermediate post
26B second lower intermediate post
27 first shelf holder
28 second shelf holder
31 first brace member
32 second brace member
F floor (installation surface)

DETAILED DESCRIPTION

Figure 1:
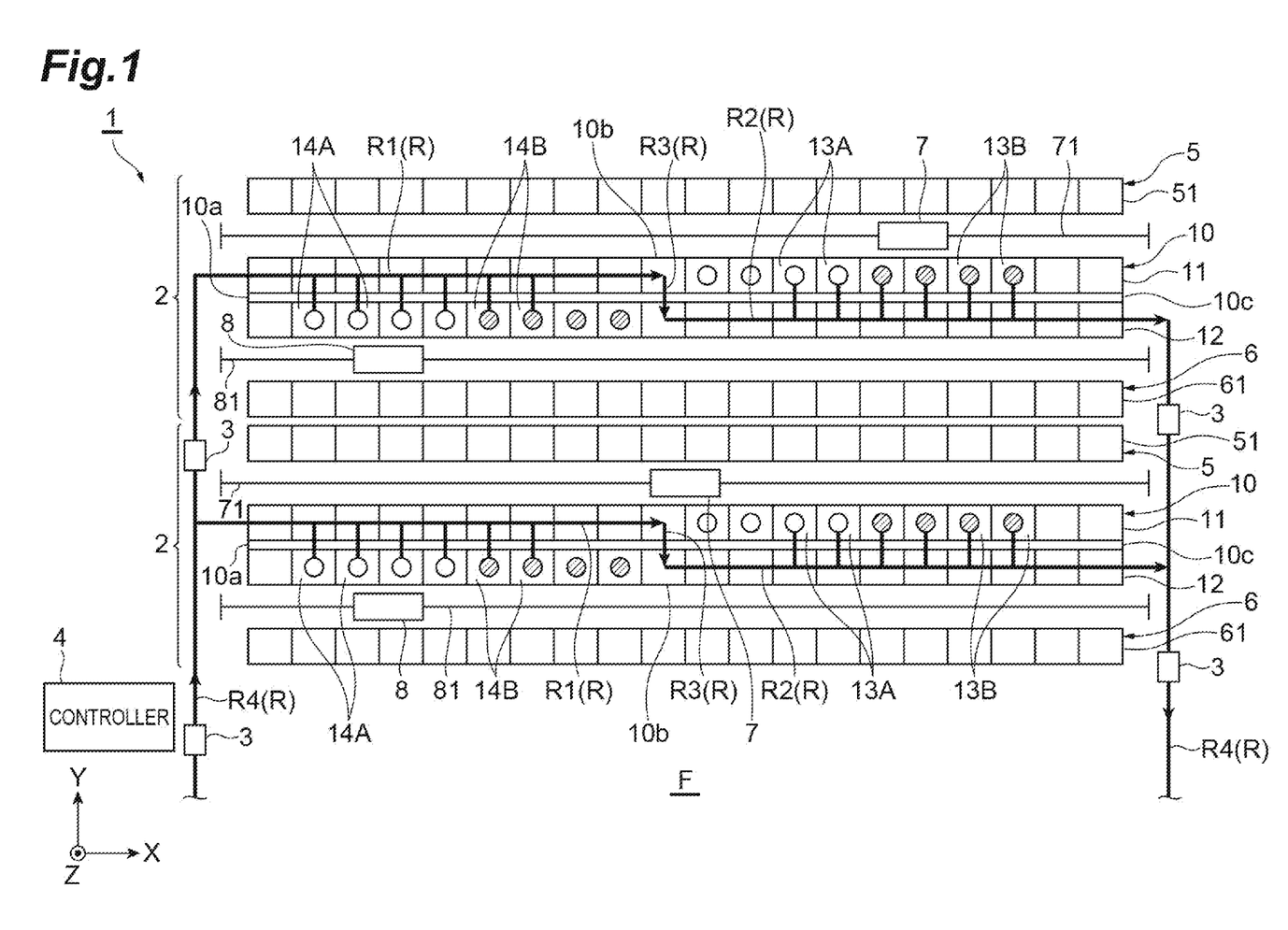
FIG. 1 is a layout diagram of an automated warehouse system including a rack according to one example.

An example of our racks will now be described in detail with reference to the drawings. Herein, like or equivalent elements are designated by like reference signs in each drawing, and duplicate description is omitted. Configuration of Automated Warehouse System As illustrated in FIG. 1, an automated warehouse system 1 includes a plurality of automated warehouses 2, a plurality of conveyance vehicles 3, and a controller 4. Hereinafter, a first horizontal direction is called "X-direction", a second horizontal direction orthogonal to the first horizontal direction is called "Y-direction", and the vertical direction is called "Z-direction".

The automated warehouses 2 are disposed in parallel along the Y-direction. Each automated warehouse 2 includes a rack (rack for automated warehouses) 10, a rack 5 disposed on one side of the rack 10 in the Y-direction, and a rack 6 disposed on the other side of the rack 10 in the Y-direction. The respective racks 10, 5, 6 are installed on a floor (installation surface) F.

The rack 10 is provided with a plurality of article placement units 11 and a plurality of article placement units 12. The article placement units 11 are disposed on a side close to the rack 5 in a matrix pattern extending in the X-direction and the Z-direction, for example, and an article can be transferred onto each of them from one side in the Y-direction. The article placement units 12 are disposed on a side close to the rack 6 in a matrix pattern extending in the X-direction and the Z-direction, for example, and an article can be transferred onto each of them from the other side in the Y-direction.

Furthermore, the rack 10 is provided with a plurality of loading ports 13A, a plurality of unloading ports 13B, a plurality of loading ports 14A, and a plurality of unloading ports 14B. The loading ports 13A and the unloading ports 13B are aligned in parallel along the X-direction below the article placement units 11 (in the lowermost level of the rack 10), and an article can be transferred onto each of them from both sides in the Y-direction. More specifically, onto each of the loading ports 13A and the unloading ports 13B, a stacker crane 7 can transfer an article from one side in the Y-direction, and a conveyance vehicle 3 can transfer an article from the other side in the Y-direction. The loading ports 14A and the unloading ports 14B are aligned in parallel along the X-direction below the article placement units 12 (in the lowermost level of the rack 10), and an article can be transferred onto each of them from both sides in the Y-direction. More specifically, onto each of the loading ports 14A and the unloading ports 14B, a conveyance vehicle 3 can transfer an article from the one side in the Y-direction, and a stacker crane 7 can transfer an article from the other side in the Y-direction.

In this example, the loading ports 14A and the unloading ports 14B are disposed between one end portion 10a and a middle portion 10b of the rack 10 in the X-direction. The loading ports 13A and the unloading ports 13B are disposed between the middle portion 10b and the other end portion 10c of the rack 10 in the X-direction.

The rack 5 is provided with a plurality of article placement units 51. The article placement units 51 are disposed in a matrix pattern extending in the X-direction and the Z-direction, for example, and an article can be transferred onto each of them from the other side in the Y-direction. The rack 6 is provided with a plurality of article placement units 61. The article placement units 61 are disposed in a matrix pattern extending in the X-direction and the Z-direction, for example, and an article can be transferred onto each of them from the one side in the Y-direction.

Each automated warehouse 2 includes a plurality of stacker cranes 7, 8. The stacker crane 7 travels along a traveling rail 71 installed on the floor F to extend in the X-direction between the rack 10 and the rack 5. The stacker crane 7 can transfer an article to and from the rack 10 and the rack 5, and conveys an article between each of the article placement units 11, 51 and each of the ports 13A, 13B. The stacker crane 8 travels along a traveling rail 81 installed on the floor F to extend in the X-direction between the rack 10 and the rack 6. The stacker crane 8 can transfer an article to and from the rack 10 and the rack 6, and conveys an article between each of the article placement units 12, 61 and each of the ports 14A, 14B.

In this example, each of the stacker cranes 7, 8 includes a traveling vehicle that can travel along the respective traveling rails 71, 81, a mast vertically provided on the traveling vehicle, a lifting platform that can ascend and descend along the mast, and a transfer device provided to the lifting platform. As each of the stacker cranes 7, 8, a known stacker crane such as a stacker crane including a transfer device including sliding forks may be used.

Each conveyance vehicle 3 travels along a route R set on the floor F. The conveyance vehicle 3 can transfer an article to and from the respective ports 13A, 13B, 14A, 14B of each rack 10. In this example, the conveyance vehicle 3 is an automatic guided vehicle (AGV) using a magnetically guiding system. In this example, the route R is configured with a magnetic tape, for example. As the conveyance vehicle 3, a known conveyance vehicle such as an AGV using another guiding system or a rail-guided vehicle may be used.

The route R includes a first route R1, a second route R2, and a third route R3 installed inside each rack 10 and a circulation route R4 installed outside the rack 10. The first route R1, the second route R2, and the third route R3 are installed below the article placement units 11 and the article placement units 12 in each rack 10 (in the lowermost level of the rack 10).

In this example, the first route R1 extends along the X-direction between the one end portion 10a and the middle portion 10b of the rack 10. The second route R2 extends along the X-direction between the middle portion 10b and the other end portion 10c of the rack 10. The third route R3 connects the first route R1 and the second route R2 at the middle portion 10b of the rack 10. The first route R1, the second route R2, and the third route R3 are, for example, one-way routes along which a conveyance vehicle 3 travels from the one end portion 10a to the other end portion 10c of the rack 10. In this example, to the circulation route R4, the upstream end of the first route R1 and the downstream end of the second route R2 are connected.

The controller 4 is a device configured to control the automated warehouse system 1. The controller 4 is connected to the respective stacker cranes 7, 8 by radio or wire, and controls operation of the respective stacker cranes 7, 8. Furthermore, the controller 4 is connected to the respective conveyance vehicles 3 by radio or wire, and controls operation of the respective conveyance vehicles 3.

The controller 4 is configured as computer equipment including a processor, a memory, a storage, and a communication device. In the controller 4, the processor executes predetermined software (program) read in the memory, for example, and controls reading and writing of data in the memory and the storage and communication between control devices performed by the communication device, thereby implementing various functions.

Configuration of Rack for Automated Warehouses

Figure 2:
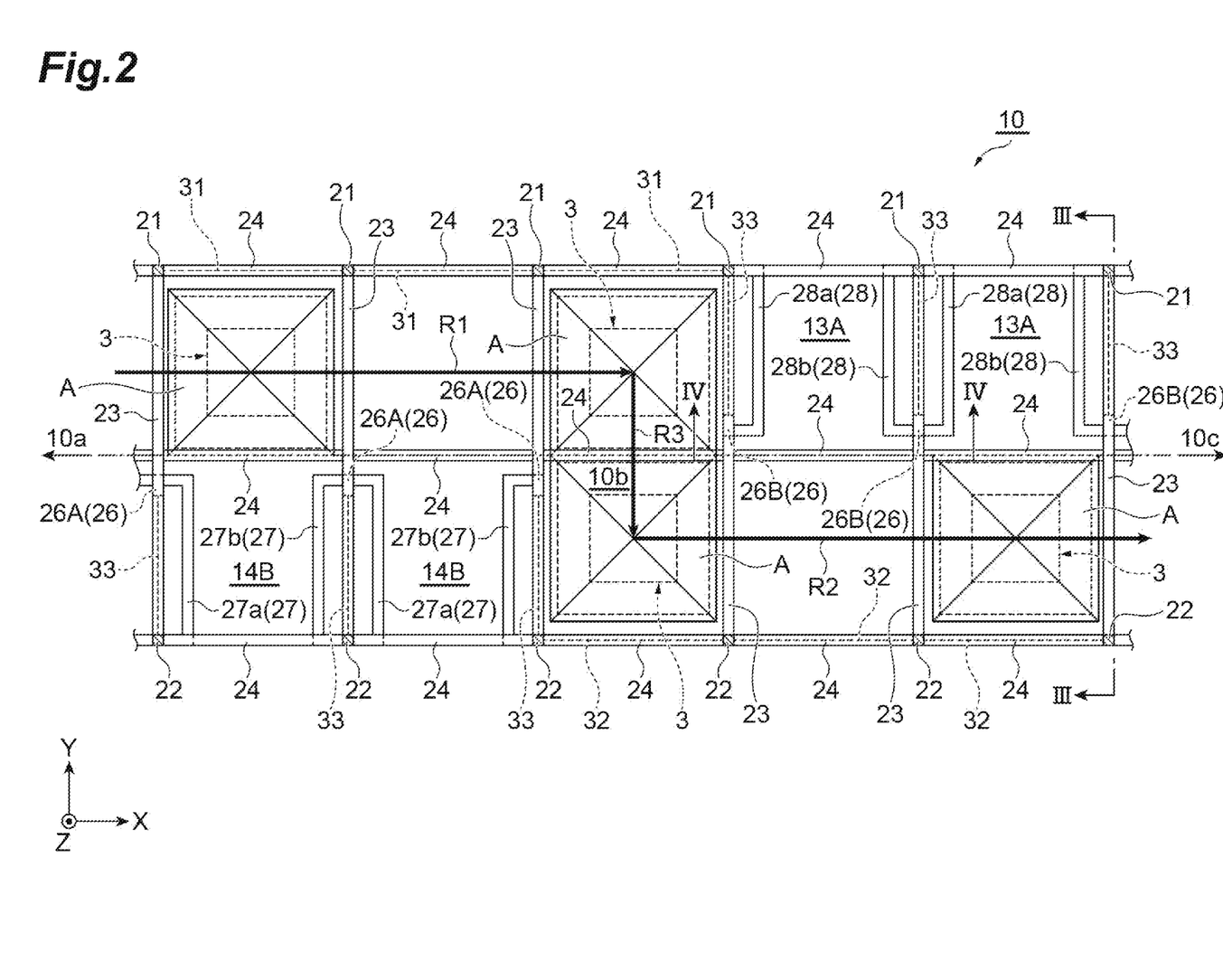
FIG. 2 is a sectional view of part of the rack illustrated in FIG. 1.
Figure 3:
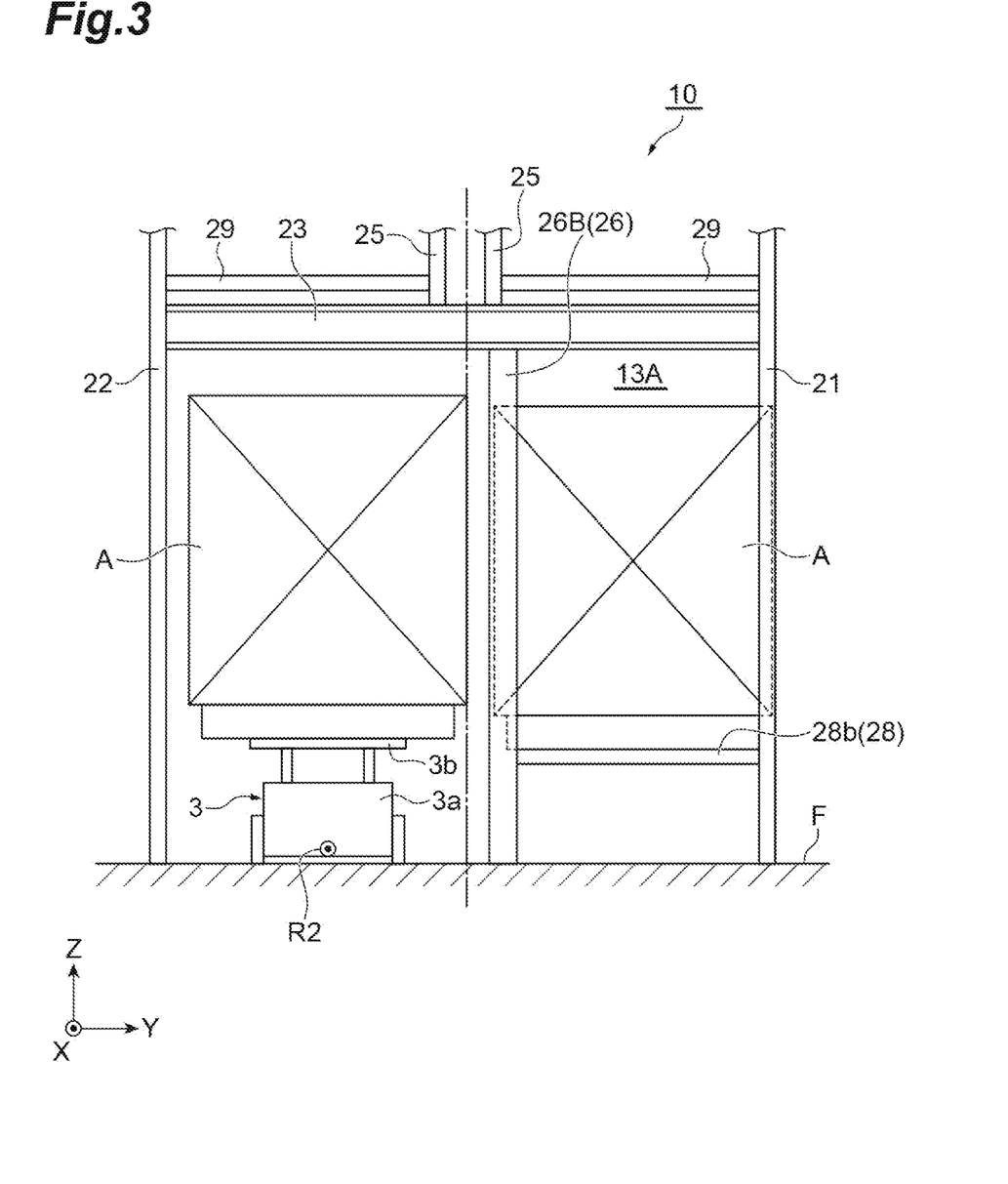
FIG. 3 is a sectional view of part of the rack along line illustrated in FIG. 2.
Figure 4:
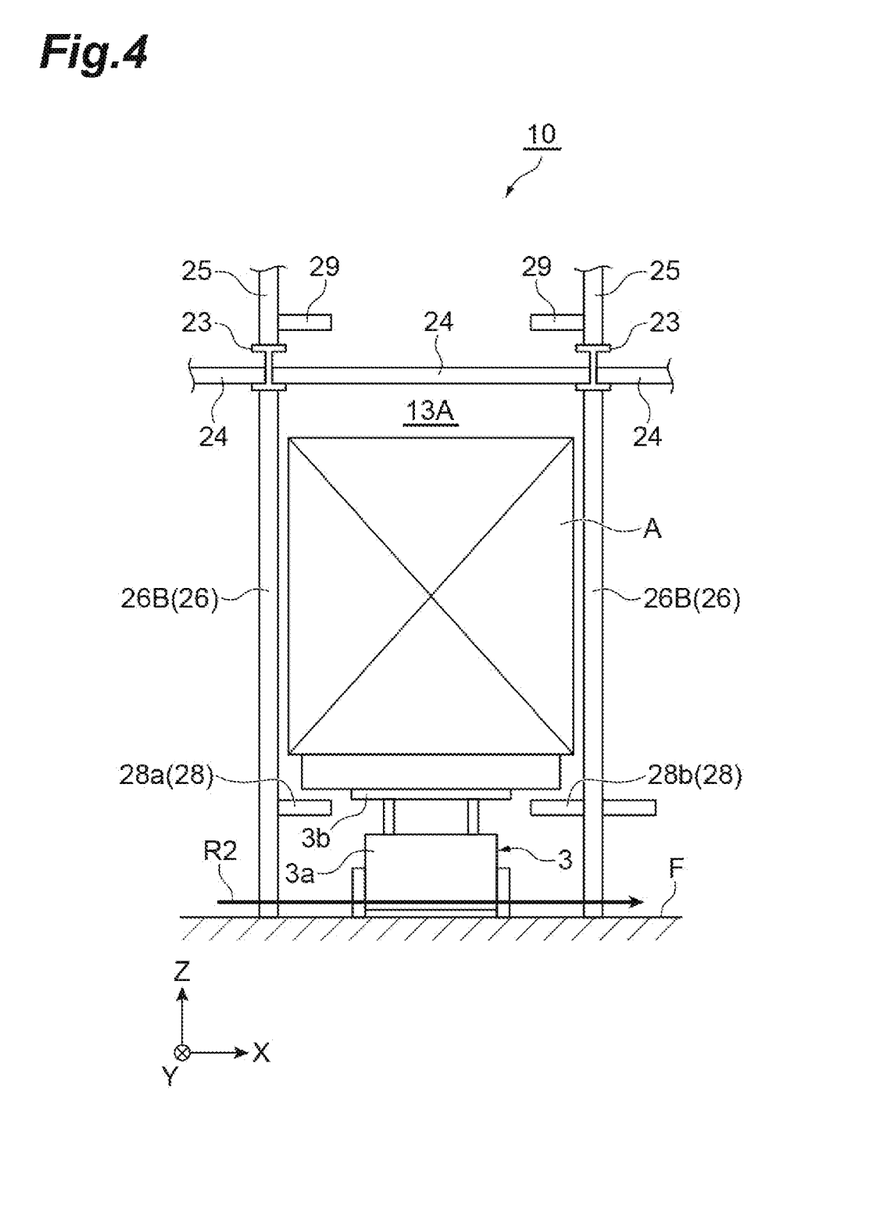
FIG. 4 is a sectional view of part of the rack along line IV-IV illustrated in FIG. 2.

As illustrated in FIGS. 2, 3, and 4, the rack 10 includes a plurality of first support posts 21, a plurality of second support posts 22, a plurality of beam members 23, a plurality of horizontal connecting members 24, a plurality of upper intermediate posts 25, and a plurality of lower intermediate posts 26.

The first support posts 21 are arranged on the floor F along the X-direction on a side closer to the rack 5 as shown in FIG. 1. Each first support post 21 extends along the Z-direction. Between first support posts 21 adjacent to each other, space is formed. The second support posts 22 are arranged on the floor F along the X-direction on a side closer to the rack 6 as shown in FIG. 1. Each second support post 22 extends along the Z-direction. Between second support posts 22 adjacent to each other, space is formed. The first support posts 21 and the second support posts 22 are disposed to face each other in the Y-direction. Each of the support posts 21, 22 is, for example, a rectangular pipe having a rectangular cross-sectional shape the long sides of which are oriented in the Y-direction.

The beam members 23 are laid over between the first support posts 21 and the second support posts 22. Each beam member 23 extends along the Y-direction, and is laid over between the corresponding first support post 21 and the corresponding second support post 22 facing each other in the Y-direction. The beam member 23 is fixed to the first support post 21 and the second support post 22 facing each other in the Y-direction. In this example, the beam member 23 is an H-beam disposed such that flange portions thereof in a pair face each other in the Z-direction and a web portion thereof extends along the Y-direction.

The horizontal connecting members 24 are, between the beam members 23 adjacent to each other, laid over between one end portions thereof, between the other end portions thereof, and between the middle portions thereof. In this example, each horizontal connecting member 24 is fixed to the lower flange portions of the corresponding beam members 23 that are H-beams. In this example, each horizontal connecting member 24 is fixed on the upper surfaces of the lower flange portions of the corresponding beam members 23 that are H-beams. However, the horizontal connecting member 24 may be fixed on, for example, the lower surfaces of the lower flange portions.

The upper intermediate posts 25 are disposed on upper sides of the beam members 23, and are connected to the beam members 23. Each upper intermediate post 25 extends along the Z-direction. In this example, a pair of upper intermediate posts 25 facing each other in the Y-direction is vertically provided on each beam member 23. More specifically, lower ends of the pair of upper intermediate posts 25 are fixed on the upper surfaces of the upper flange portions of each beam member 23 that is an H-beam. Between the pair of upper intermediate posts 25, space is formed. The central position between the pair of upper intermediate posts 25 corresponds to the central position between the first support post 21 and the second support post 22 facing each other in the Y-direction.

In this example, on the side closer to the rack 5 as shown in FIG. 1, the article placement units 11 described above are formed by the upper intermediate posts 25 arranged on the beam members 23 in the X-direction and portions, above the beam members 23, of the first support posts 21 as shown in FIG. 1. On the side closer to the rack 6 as shown in FIG. 1, the article placement units 12 described above are formed by the upper intermediate posts 25 arranged on the beam members 23 in the X-direction and portions, above the beam members 23, of the second support posts 22 as shown in FIG. 1. Herein, to upper intermediate posts 25 adjacent to each other in the X-direction, a back-side brace may be attached.

The lower intermediate posts 26 are disposed between the floor F and the beam members 23, and are connected to the beam members 23. The lower intermediate posts 26 are arranged on the floor F along the X-direction. Each lower intermediate post 26 extends in the Z-direction. In this example, the upper end of each lower intermediate post 26 is fixed on the lower surface of the lower flange portion of the corresponding beam member 23 that is an H-beam.

A plurality of first lower intermediate posts 26A of the lower intermediate posts 26 are disposed in series along the X-direction between the one end portion 10a and the middle portion 10b of the rack 10 in the X-direction. The first lower intermediate posts 26A is disposed such that the distance to the first support posts 21 in the Y-direction is greater than the distance to the second support posts 22 in the Y-direction. In other words, each first lower intermediate post 26A is disposed in a position closer to the corresponding second support post 22 with respect to the central position between the corresponding first support post 21 and the second support post 22 facing each other in the Y-direction.

A plurality of second lower intermediate posts 26B of the lower intermediate posts 26 are disposed in series along the X-direction between the middle portion 10b and the other end portion 10c of the rack 10 in the X-direction. The second lower intermediate posts 26B are disposed such that the distance to the second support posts 22 in the Y-direction is greater than the distance to the first support posts 21 in the Y-direction. In other words, each second lower intermediate post 26B is disposed in a position closer to the corresponding first support post 21 with respect to the central position between the corresponding first support post 21 and the second support post 22 facing each other in the Y-direction.

Each of the lower intermediate posts 26A, 26B has such a shape that the width in the Y-direction is larger than the width in the X-direction. In this example, the width of each of the lower intermediate posts 26A, 26B in the X-direction is equivalent to the width of each of the support posts 21, 22 in the X-direction. The width of each of the lower intermediate posts 26A, 26B in the Y-direction is larger than the width of each of the support posts 21, 22 in the Y-direction. Each of the lower intermediate posts 26A, 26B is, for example, a rectangular pipe having a rectangular cross-sectional shape the long sides of which are oriented in the Y-direction.

The height of the lower surface of each beam member 23 and the height of the lower surface of each horizontal connecting member 24 are higher than the height of the upper surface of an article A placed on a conveyance vehicle 3. The space between a first lower intermediate post 26A and a first support post 21 facing each other in the Y-direction and the space between a second lower intermediate post 26B and a second support post 22 facing each other in the Y-direction are larger than the widths of a conveyance vehicle 3 and an article A in the Y-direction. The space (distance in the X-direction) between the first lower intermediate post 26A and the second lower intermediate post 26B in the middle portion 10b of the rack 10 is larger than the widths of the conveyance vehicle 3 and the article A in the X-direction.

With this configuration, in areas below the beam members 23 and between the first lower intermediate posts 26A and the first support posts 21 facing each other in the Y-direction, the first route R1 is installed, and these areas are used as a traveling path along which a conveyance vehicle 3 carrying an article A can travel. In areas below the beam members 23 and between the second lower intermediate posts 26B and the second support posts 22 facing each other in the Y-direction, the second route R2 is installed, and these areas are used as a traveling path along which the conveyance vehicle 3 carrying the article A can travel. Furthermore, in an area below the horizontal connecting member 24 in the middle portion 10b of the rack 10 and between the first lower intermediate post 26A and the second lower intermediate post 26B therein, the third route R3 is installed, and this area is used as a traveling path along which the conveyance vehicle 3 carrying the article A can travel.

To a pair of first lower intermediate posts 26A adjacent to each other and a pair of second support posts 22 facing the pair of first lower intermediate posts 26A in the Y-direction, a first shelf holder 27 is provided. The first shelf holder 27 includes: a shelf holding member 27a laid over between one first lower intermediate post 26A and one second support post 22 in the pair; and a shelf holding member 27b laid over between the other first lower intermediate post 26A and the other second support post 22. The first shelf holder 27 thus configured is provided in plurality along the first route R1, whereby the loading ports 14A and the unloading ports 14B described above are configured as shown in FIG. 1.

To a pair of second lower intermediate posts 26B adjacent to each other and a pair of first support posts 21 facing the pair of second lower intermediate posts 26B in the Y-direction, a second shelf holder 28 is provided. The second shelf holder 28 includes: a shelf holding member 28a laid over between one second lower intermediate post 26B and one first support post 21 in the pair; and a shelf holding member 28b laid over between the other second lower intermediate post 26B and the other first support post 21. The second shelf holder 28 thus configured is provided in plurality along the second route R2, whereby the loading ports 13A and the unloading ports 13B described above are configured as shown in FIG. 1.

In portions of the rack 10 above the beam members 23 and the horizontal connecting members 24, a third shelf holder 29 is provided to correspond to each of the article placement units 11, 12 as shown in FIG. 1. The third shelf holder 29 provided to correspond to each article placement unit 11 includes a shelf holding member laid over between a first support post 21 and an upper intermediate post 25 facing each other in the Y-direction. The third shelf holder 29 provided to correspond to each article placement unit 12 includes a shelf holding member laid over between a second support post 22 and an upper intermediate post 25 facing each other in the Y-direction.

To portions, below the beam members 23, of the first support posts 21 facing the first lower intermediate posts 26A in the Y-direction (i.e., the first support posts 21 disposed along the first route R1), first brace members 31 are provided. Each first brace member 31 is disposed in an inclined manner between first support posts 21 adjacent to each other, and is attached to the first support posts 21 adjacent to each other. To portions, below the beam members 23, of the second support posts 22 facing the second lower intermediate posts 26B in the Y-direction (i.e., the second support posts 22 disposed along the second route R2), second brace members 32 are provided. Each second brace member 32 is disposed in an inclined manner between second support posts 22 adjacent to each other, and is attached to the second support posts 22 adjacent to each other. Between a first lower intermediate post 26A and a second support post 22 facing each other in the Y-direction, and between a second lower intermediate post 26B and a first support post 21 facing each other in the Y-direction, third brace members 33 are provided. Herein, in an area between first lower intermediate posts 26A adjacent to each other in the X-direction, which is an area where an article is not transferred to and from each of the loading ports 14A and the unloading ports 14B, a brace member may be attached to the first lower intermediate posts 26A adjacent to each other. Furthermore, in an area between second lower intermediate posts 26B adjacent to each other in the X-direction, which is an area where an article is not transferred to and from each of the loading ports 13A and the unloading ports 13B, a brace member may be attached to the second lower intermediate posts 26B adjacent to each other.

Transfer Operation of Conveyance Vehicle

As illustrated in FIGS. 3 and 4, each conveyance vehicle 3 includes a vehicle body 3a for traveling along the route R and a lifter 3b provided on the vehicle body 3a. An article A is to be placed onto the lifter 3b. The lifter 3b can ascend and descend with respect to the vehicle body 3a. Herein, the article A is a load packed in a box placed on a pallet, for example.

Figure 5:
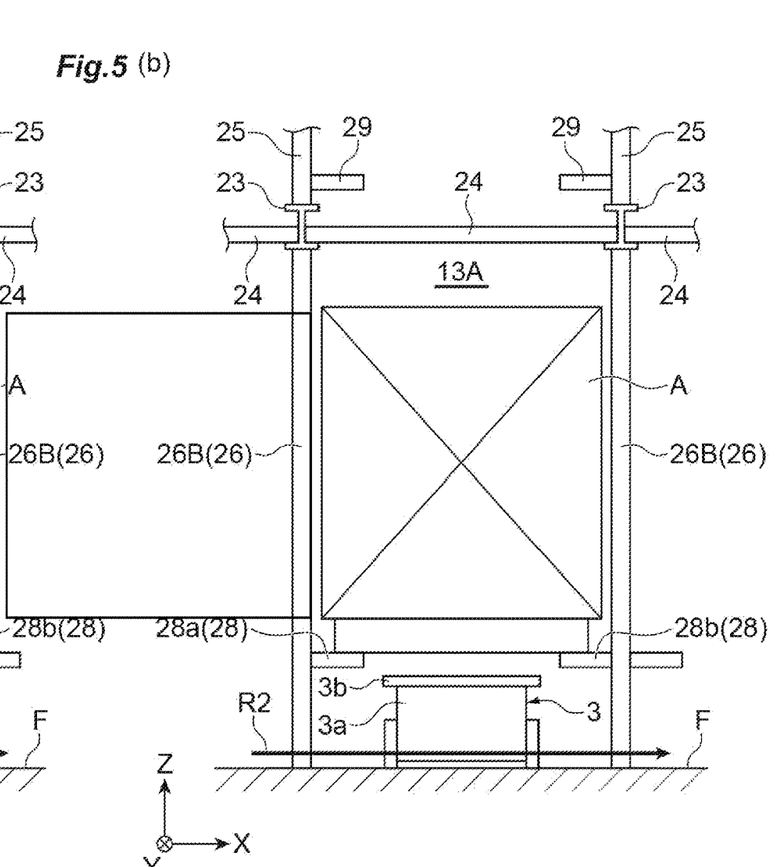
FIGS. 5(a) and 5(b) are front views of a loading port of the rack illustrated in FIG. 1.

When an article A is loaded onto a loading port 13A, as illustrated in FIG. 5(a), the conveyance vehicle 3 enters the loading port 13A from the second route R2 with the lifter 3b, on which the article A is placed, being raised. As illustrated in FIG. 5(b), the conveyance vehicle 3 then stops in the loading port 13A and, in this state, lowers the lifter 3b to place the article A onto the second shelf holder 28. Subsequently, the conveyance vehicle 3 returns to the second route R2 from inside the loading port 13A with the empty lifter 3b being lowered. Herein, the conveyance vehicle 3 can load an article A onto a loading port 14A by operation between the first route R1 and the loading port 14A in the same manner.

Figure 6:
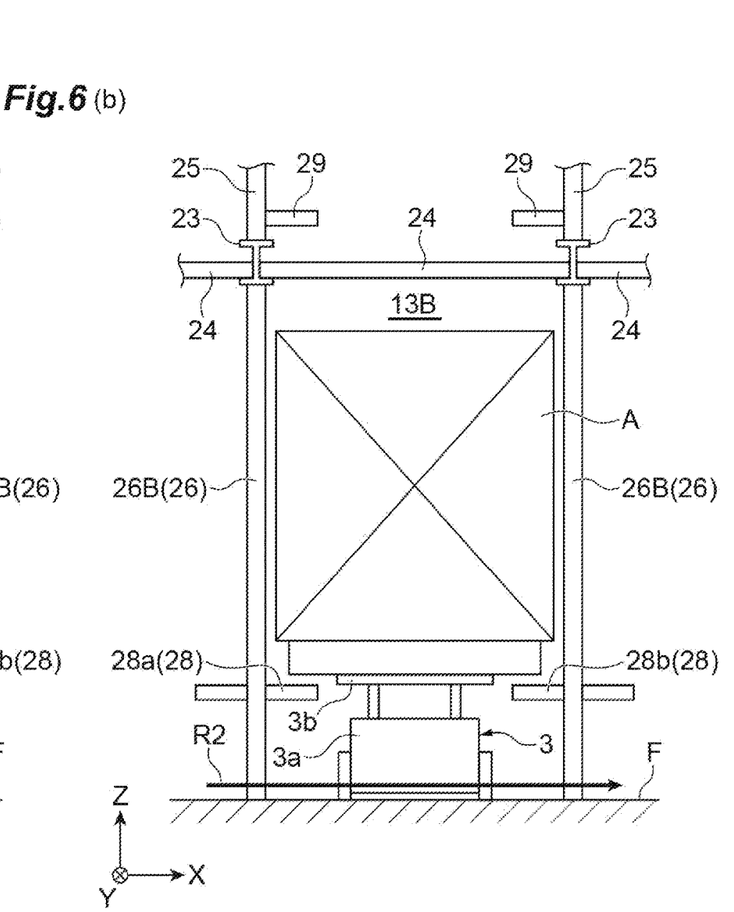
FIGS. 6(a) and 6(b) are front views of an unloading port of the rack illustrated in FIG. 1.

When unloading an article B from an unloading port 13B, as illustrated in FIG. 6(a), the conveyance vehicle 3 enters the unloading port 13B from the second route R2 with the empty lifter 3b being lowered. As illustrated in FIG. 6(b), the conveyance vehicle 3 stops in the unloading port 13B and, in this state, raises the lifter 3b to place the article B onto the lifter 3b. Subsequently, the conveyance vehicle 3 returns to the second route R2 from inside the unloading port 13B with the lifter 3b, on which the article A is placed, being raised. Herein, the conveyance vehicle 3 can unload an article B from an unloading port 14B by operation between the first route R1 and the unloading port 14B in the same manner.

Functions and Effects

In the rack 10, areas below the beam members 23 and between the first lower intermediate posts 26A and the first support posts 21 facing each other in the Y-direction can be used as a traveling path along which a conveyance vehicle 3 carrying an article A can travel. Herein, the first lower intermediate posts 26A are disposed such that the distance to the first support posts 21 in the Y-direction is greater than the distance to the second support posts 22 in the Y-direction. Furthermore, areas below the beam members 23 and between the second lower intermediate posts 26B and the second support posts 22 facing each other in the Y-direction can be used as a traveling path along which the conveyance vehicle 3 carrying the article A can travel. Herein, the second lower intermediate posts 26B are disposed such that the distance to the second support posts 22 in the Y-direction is greater than the distance to the first support posts 21 in the Y-direction. Thus, with the rack 10, it is possible to cause the conveyance vehicle 3 to smoothly pass through lower portions thereof on both sides of the side of the first support posts 21 and the side of the second support posts 22 while preventing the depth dimension (width dimension in the Y-direction) from increasing.

In the rack 10, the first lower intermediate posts 26A are disposed in series between the one end portion 10a and the middle portion 10b in the X-direction, and the second lower intermediate posts 26B are disposed in series between the middle portion 10b and the other end portion 10c in the X-direction. By this configuration, the traveling path for a conveyance vehicle 3 can be switched from the side of the first support posts 21 to the side of the second support posts 22 at the middle portion 10b of the rack 10 in the X-direction.

In the rack 10, the first brace members 31 are provided to portions of the first support posts 21 facing the first lower intermediate posts 26A in the Y-direction, the portions of the first support posts 21 located on lower sides of the beam members 23, and the second brace members 32 are provided to portions of the second support posts 22 facing the second lower intermediate posts 26B in the Y-direction, the portions of the second support posts 22 located on lower sides of the beam members 23. By this configuration, it is possible to increase the strength of a lower portion of the rack 10 while preventing dead space from increasing. Furthermore, the first brace members 31 and the second brace members 32 can be disposed in a balanced manner, whereby the earthquake-resistance of the rack 10 can be increased.

In the rack 10, each of the lower intermediate posts 26A, 26B has such a shape that the width thereof in the Y-direction is larger than the width thereof in the X-direction. By this configuration, it is possible to increase the strength of the lower intermediate posts 26 while preventing dead space from increasing.

In the rack 10, the first shelf holder 27 is provided to a pair of first lower intermediate posts 26A adjacent to each other and a pair of second support posts 22 facing the pair of first lower intermediate posts 26A in the Y-direction, and the second shelf holder 28 is provided to a pair of second lower intermediate posts 26B adjacent to each other and a pair of first support posts 21 facing the pair of second lower intermediate posts 26B in the Y-direction. The structure of the rack 10 can be simplified when the lower intermediate posts 26 are used as posts for installing the shelf holders in this manner.

In the rack 10, a configuration is used in which the upper end of each lower intermediate post 26 is fixed to the corresponding beam member 23. By this configuration, when the rack 10 is installed, the position of the lower intermediate post 26 in the Y-direction can be adjusted depending on the widths of a conveyance vehicle 3 and an article A in the Y-direction (the width of either larger one). In other words, a plurality of types of lower intermediate posts 26 do not have to be prepared depending on the widths of the conveyance vehicle 3 and the article A in the Y-direction, and thus the traveling path having a suitable width can be configured with common lower intermediate posts 26.

In the rack 10, each horizontal connecting member 24 is fixed to the lower flange portions of the corresponding beam members 23 that are H-beams. By this configuration, even when a space to insert sliding forks of each of the stacker cranes 7, 8 between the horizontal connecting member 24 and the third shelf holder 29 immediately above is necessary, the height of the third shelf holder 29 can be kept constant regardless of the size of the H-beams (space between the lower flange portion and the upper flange portion).

Modifications

This disclosure is not limited to the above-described example. For example, in the rack 10, the first lower intermediate posts 26A may be disposed in series from the one end portion 10a to the other end portion 10c of the rack 10 in the X-direction. Alternatively, the second lower intermediate posts 26B may be disposed in series from the one end portion 10a to the other end portion 10c of the rack 10 in the X-direction. By this modification, the traveling path that enables a conveyance vehicle 3 to smoothly pass while preventing the depth dimension from increasing can be provided linearly. Herein, the middle portion 10b does not have to be the central position between the one end portion 10a and the other end portion 10c.

Each conveyance vehicle 3 may include a transfer device other than the lifter 3b. The transfer device other than the lifter 3b may be, for example, an arm of a hook type or a clamp type, or a fork. In this instance, the conveyance vehicle 3 can transfer an article A to and from each of the ports 14A, 14B by stopping on the first route R1 and expanding and contracting the arm or the fork thereto and therefrom. The conveyance vehicle 3 can also transfer an article A to and from each of the ports 13A, 13B by stopping on the second route R2 and expanding and contracting the arm or the fork thereto and therefrom.

The invention claimed is:

1. A rack for automated warehouses comprising:
a plurality of first support posts adapted to be arranged on an installation surface along a first horizontal direction;
a plurality of second support posts disposed to face the first support posts in a second horizontal direction orthogonal to the first horizontal direction, and adapted to be arranged on the installation surface along the first horizontal direction;
a plurality of beam members laid over between the first support posts and the second support posts;
a plurality of upper intermediate posts disposed on upper sides of the beam members and connected to the beam members; and
a plurality of lower intermediate posts adapted to be disposed between the installation surface and the beam members and connected to the beam members, wherein
the lower intermediate posts include a plurality of first lower intermediate posts disposed in series along the first horizontal direction, and
the first lower intermediate posts are disposed such that the distance to the first support posts in the second horizontal direction is greater than the distance to the second support posts in the second horizontal direction.

2. The rack for automated warehouses according to claim 1, wherein
the lower intermediate posts further comprise a plurality of second lower intermediate posts disposed in series along the first horizontal direction, and
the second lower intermediate posts are disposed such that the distance to the second support posts in the second horizontal direction is greater than the distance to the first support posts in the second horizontal direction.

3. The rack for automated warehouses according to claim 2, wherein
the first lower intermediate posts are disposed in series between one end portion of the rack and a middle portion of the rack in the first horizontal direction, and
the second lower intermediate posts are disposed in series between the middle portion of the rack and the other end portion of the rack in the first horizontal direction.

4. The rack for automated warehouses according to claim 3 further comprising:
a first brace member disposed on portions of the first support posts facing the first lower intermediate posts in the second horizontal direction, the portions of the first support posts located on lower sides of the beam members; and
a second brace member disposed on portions of the second support posts facing the second lower intermediate posts in the second horizontal direction, the portions of the second support posts located on lower sides of the beam members.

5. The rack for automated warehouses according to claim 3, wherein each of the first lower intermediate posts and each of the second lower intermediate posts have such shapes that the width thereof in the second horizontal direction is larger than the width thereof in the first horizontal direction.

6. The rack for automated warehouses according to claim 3 further comprising:
a first shelf holder disposed on a pair of first lower intermediate posts adjacent to each other among the first lower intermediate posts and a pair of second support posts facing the pair of first lower intermediate posts in the second horizontal direction among the second support posts; and
a second shelf holder disposed on a pair of second lower intermediate posts adjacent to each other among the second lower intermediate posts and a pair of first support posts facing the pair of second lower intermediate posts in the second horizontal direction among the first support posts.

7. The rack for automated warehouses according to claim 2 further comprising:
a first brace member disposed on portions of the first support posts facing the first lower intermediate posts in the second horizontal direction, the portions of the first support posts located on lower sides of the beam members; and
a second brace member disposed on portions of the second support posts facing the second lower intermediate posts in the second horizontal direction, the portions of the second support posts located on lower sides of the beam members.

8. The rack for automated warehouses according to claim 7, wherein each of the first lower intermediate posts and each of the second lower intermediate posts have such shapes that the width thereof in the second horizontal direction is larger than the width thereof in the first horizontal direction.

9. The rack for automated warehouses according to claim 7 further comprising:
a first shelf holder disposed on a pair of first lower intermediate posts adjacent to each other among the first lower intermediate posts and a pair of second support posts facing the pair of first lower intermediate posts in the second horizontal direction among the second support posts; and
a second shelf holder disposed on a pair of second lower intermediate posts adjacent to each other among the second lower intermediate posts and a pair of first support posts facing the pair of second lower intermediate posts in the second horizontal direction among the first support posts.

10. The rack for automated warehouses according to claim 2, wherein each of the first lower intermediate posts and each of the second lower intermediate posts have such shapes that the width thereof in the second horizontal direction is larger than the width thereof in the first horizontal direction.

11. The rack for automated warehouses according to claim 10 further comprising:
a first shelf holder disposed on a pair of first lower intermediate posts adjacent to each other among the first lower intermediate posts and a pair of second support posts facing the pair of first lower intermediate posts in the second horizontal direction among the second support posts; and
a second shelf holder disposed on a pair of second lower intermediate posts adjacent to each other among the second lower intermediate posts and a pair of first support posts facing the pair of second lower intermediate posts in the second horizontal direction among the first support posts.

12. The rack for automated warehouses according to claim 2 further comprising:
- a first shelf holder disposed on a pair of first lower intermediate posts adjacent to each other among the first lower intermediate posts and a pair of second support posts facing the pair of first lower intermediate posts in the second horizontal direction among the second support posts; and
- a second shelf holder disposed on a pair of second lower intermediate posts adjacent to each other among the second lower intermediate posts and a pair of first support posts facing the pair of second lower intermediate posts in the second horizontal direction among the first support posts.

13. The rack for automated warehouses according to claim 2 further comprising:
- a first shelf holder disposed on a pair of first lower intermediate posts adjacent to each other among the first lower intermediate posts and a pair of second support posts facing the pair of first lower intermediate posts in the second horizontal direction among the second support posts; and
- a second shelf holder disposed on a pair of second lower intermediate posts adjacent to each other among the second lower intermediate posts and a pair of first support posts facing the pair of second lower intermediate posts in the second horizontal direction among the first support posts.

14. The rack for automated warehouses according to claim 1, wherein the first lower intermediate posts are disposed in series from one end portion to of the rack the other end portion of the rack in the first horizontal direction.

* * * * *